United States Patent [19]

Hazlett

[11] Patent Number: 4,848,465

[45] Date of Patent: Jul. 18, 1989

[54] USE OF ALKALI METAL SILICATE FOAM WITH A CHEMICAL BLOWING AGENT

[75] Inventor: Randy D. Hazlett, Dallas, Tex.

[73] Assignee: Mobil Oil Corp., New York, N.Y.

[21] Appl. No.: 123,615

[22] Filed: Nov. 20, 1987

[51] Int. Cl.[4] .............................................. E21B 43/22
[52] U.S. Cl. .................................... 166/270; 166/272; 166/292; 166/309
[58] Field of Search ............... 166/270, 272, 292, 293, 166/294, 300, 309; 252/8.551, 8.554; 106/87

[56] References Cited

U.S. PATENT DOCUMENTS

| | | | |
|---|---|---|---|
| 4,142,909 | 3/1979 | Gaines | 106/87 |
| 4,232,741 | 11/1980 | Richardson et al. | 166/281 |
| 4,333,764 | 6/1982 | Richardson | 106/87 |
| 4,340,427 | 7/1982 | Sutton | 106/87 |
| 4,450,010 | 5/1984 | Burkhalter et al. | 106/87 |
| 4,640,361 | 2/1987 | Smith et al. | 166/292 X |
| 4,665,985 | 5/1987 | Berrod et al. | 166/292 X |
| 4,676,318 | 6/1987 | Myers et al. | 166/293 |

Primary Examiner—Bruce M. Kisliuk
Attorney, Agent, or Firm—Alexander J. McKillop; Charles J. Speciale; Charles A. Malone

[57] ABSTRACT

A method for reducing the permeability in a desired area of a formation wherein a solid foam is formed in situ by injecting a one phase solution into the formation. Said solution comprises an alkali metal silicate, a chemical surfactant, and an alkali metal salt of azodicarboxylic acid in an amount sufficient to produce a foam. The azodicarboxylic acid salt decomposes when the pH is reduced to less than about 12 and generates gas in an amount sufficient to form a foam which subsequently hardens. When hardened the foam reduces the permeability in a desired area.

24 Claims, No Drawings

USE OF ALKALI METAL SILICATE FOAM WITH A CHEMICAL BLOWING AGENT

FIELD OF THE INVENTION

This invention relates to a method for reducing permeability of a subterranean formation, primarily for use in steam stimulation recovery techniques. More particularly, this invention relates to a method of blocking an area of a subterranean formation by use of a rigid, impermeable foam includind alkali metal silicates wherein chemical blowing agents are utilized.

BACKGROUND OF THE INVENTION

Steam stimulation recovery techniques are widely used to increase production from an oil bearing formation. In steam stimulation techniques, steam is used to heat the section of a formation adjacent to a wellbore so that production rates are increaesd through lowered oil viscosities and the corresponding reduced resistance to flow through the injected area.

In a typical conventional steam stimulation injection cycle, steam is injected into the desired section of a reservoir. A shut-in or "soak" phase may follow, in which thermal energy diffuses through the formation. A production phase follows in which oil is produced until oil production rates decreases to an uneconomical amount. Subsequent injection cycles are often used to increase recovery.

Steam stimulation techniques recover oil at rates as high as 80-85% of the original oil in place in zones in which the steam contacts the reservoir. However, there are problems in contacting all zones of a reservoir due to heterogeneities in the reservoir such as high/low permeability streaks, which may cause gravity override, and steam fingering. When any of these heterogeneities are present in a reservoir, the efficiency of the process begins to deteriorate due to reduced reservoir pressure, reservoir reheating, longer production cycles, and reduced oil-steam ratios. As a result, steam stimulation may become unprofitable.

Various methods have been proposed so that steam can be diverted to uncontacted zones of a reservoir. One such method is disclosed in U.S. Pat. No. 2,402,588 issued to Andresen ("Andresen"). Andresen discloses a method of sealing a more permeable area of a reservoir by injecting into a reservoir a dilute alkaline solution of sodium silicate under low pressure. An acid gas such as carbon dioxide is then injected to reduce the alkalinity of the solution, resulting in gelling.

Another method is disclosed in U.S. Pat. No. 3,645,336 issued to Young et al. ("Young"). Young discloses the plugging of a zone of a reservoir by injecting a mixture of steam and sodium silicate into the permeable zone. A second mixture containing steam and a gelling agent such as carbon dioxide is injected in the permeable zone, and the two mixtures are allowed to react. A hard silica gel plug is formed.

Yet another method is disclosed in U.S. Pat. No. 3,805,893 to Sarem ("Sarem"). Sarem discloses the formation of a gelatinous precipitate by injection of small slugs of a dilute aqueous alkaline metal silicate solution, followed by water and then a dilute aquenous solution of a water soluble material which reacts with the alkali metal silicate to form a precipitate. The precipitate hardens to form a substantially impermeable substance.

U.S. Pat. No. 3,965,986 issued to Christopher ("Christopher") discloses still another method. In Christopher, a slug of fumed colloidal silica and water is injected into a reservoir. This slug has a relatively low viscosity. A surfactant is then injected which forms a gel on contact with the silica slug.

Meyers et al. ("Meyers") disclosed a method for reducing the permeability of a subterranean formation in U.S. Pat. No. 4,676,318. Here an alkali metal silicate foam was produced by injecting into the formation a solution of alkali metal silicate, a chemical surfactant, and a non-condensible gas. The foam hardens into a substantially impermeable solid. The foam may be used to reduce permeability in areas of the formation which have been steam swept during steam stimulation cycles. Thus, subsequent steam stimulation cycles were directed to uncontacted areas of the formation.

In each of the above methods the gas required for forming the foam was injected into the formation. Therefore, what is required is a method whereby a foam can be generated by a gas released in-situ.

SUMMARY OF THE INVENTION

In the practice of this invention, steam is diverted from selected areas of an oil bearing formation by injecting into said formation a solution including alkali metal silicate, a chemical blowing agent, and a cationic chemical surfactant ("silicate solution"). Said chemical blowing agent is suitable for the conditions existing in said formation. This solution is injected into the desired area of the formation in an amount sufficient to treat said desired area. The rate or injection is sufficient to allow placement of said solution into the desired formation area or zone prior to significant gas release from said chemical blowing agent. Foam generated in a high permeability strata of said formation causes steam diversion to a less permeable zone thereby enhancing sweep of the formation.

It is therefore an object of this invention to provide for a chemical blowing agent that is soluble in the injection solution which decomposes in-situ to liberate gas at a rate and in an amount sufficient to make a foam.

It is another object of this invention to provide for a method whereby the formulation of the foamable injection solution can be modified thus allowing for variable propagation distances prior to foam generation.

It is yet another object of this invention to alleviate injectivity problems by utilizing a single phase solution.

It is still another object of this invention to form a foamed gel in-situ.

It is a yet still further object of this invention to increase the effectiveness of a gel during profile control while reducing the amount of gel utilized.

DESCRIPTION OF THE PREFERRED EMBODIMENT

In a preferred embodiment, at least one, and usually three or four conventional steam stimulation cycles are completed. After three or four steam stimulation cycles, the efficiency of the process begins to deteriorate. Steam continues to preferentially contact reservoir areas which were previously swept by steam. At this point, steam diversion becomes desirable to ensure further productive stimulation.

A solution is injected into the steam swept zones which includes an alkali metal silicate, preferably sodium silicate, one or more cationic chemical surfactants, and a chemical blowing agent. The volume of silicate solution injected depends on the area of the reservoir requiring permeability reduction and on the magnitude of the reservoir heterogeneity. For example, if the heterogeneity has been identified as a local high permeability streak or fracture, the volume of foamed solution required may only be 100 to 200 cubic meters. However, if there is generally high permeability in the steam swept zone, volumes of up to 1,000 cubic meters may be required. As the volume of solution used should be determined following evaluation of the reservoir, the aforementioned volumes should not be considered limits, but estimates of the average volume required.

The solution may be injected through the wells by which steam was injected. More than one well may be used for injection in order plug a communication channel. The solution may preferably contact the zones of the formation which have been previously swept by steam, as resistance to flow is lowest in these zones. Silicate contained in the solution should be between about 2 percent and 5 percent of the solution weight. Commercially available silicate solutions include silicon dioxide and disodium oxide. The ratio of moles of silicon dioxide to moles of disodium oxide may vary from about 1:1 to 1:4. The ratio in a typical commercial solution is about 1:3.22. The solution is most effective when the solution includes about 0.001 to 0.005 moles of cationic surfactant per mole of sodium silicate. The solution may also contain a catalyst to initiate gel formation. This catalyst should be a weak acid such as ammonium sulfate in an amount from about 0.5 to 0.6 moles of catalyst per mole of disodium oxide. A silicate solution is disclosed in U.S. Pat. No. 4,676,318. This patent is incorporated by reference herein.

A chemical blowing agent which can be utilized in the silicate injection solution comprises an alkali metal salt of azodicarboxylic acid. The sodium salt of azodicarboxylic acid is preferred. Potassium, lead, cadmium, zinc, and barium salts of azodicarboxylic acid can also be used. This compound can be formed on site by the treatment of azodicarbonamide with sodium hydroxide and alkali carbonate with resulting ammonia evolution. When heated, this salt liberates nitrogen and carbon dioxide, yet it is very stable at room temperature in basic solutions of a pH greater than 12. Surfactant addition may be reduced or even eliminated in some instances due to surfactant production in-situ. The pH decline from hydroxide consumption will accelerate the foam generation reaction. The decomposition of the salt of azodicarboxylic acid is auto-catalytic in that hydroxide is consumed. The accompanying pH change will initiate gel formation, reducing, and possibly eliminating, the required weak acid component in the formulation. Because the sodium salt of azodicarboxylic acid is extremely soluble in water, a desired amount of foam can be generated for even the most permeable zones in a formation by incorporating the required amount of said salt into the solution. Toluene sulfonyl hydrazide and p,p'-oxybis(benzenesulfonyl hydrazide) also develop water solubility at high pH, but performance economics lie firmly in favor of the modified azodicarbonamide. Toluene sulfonyl hydrazide and p,p'-oxybis(benzenesulfonyl hydrazide) decompositions are not acid catalyzed; therefore, gas liberation would slow with declining pH.

The type of surfactant used is also an important variable. Tetra-alkyl ammonium salts, such as trimethyldecyl ammonium chloride, are one preferred class of effective surfactants. Cationic surfactants are generally preferred because of superior foaming when contacting the generated gases and silicate solutions. While not wishing to be bound by theory, it appears that cationic surfactants such as tetra-alkyl ammonium chloride chemically react with silicate monomers resulting in the formation of high foaming, long chain quaternary alkyl ammonium silicates. When anionic and nonionic surfactants are used, the same high degree of foam formation is not observed.

The pH of the solution will also vary depending on how deep into the reservoir the solution must penetrate and how large a volume of foam is desired. Silicate solutions designed to foam and gel in a pH range of 9.5 to 11 generally produce a high quality and stable foam. Also, an alkaline solution will temporarily retard the gelling process, thereby allowing the solution to be pumped deep into the formation before gas is generated and foaming occurs. A weak acid such as ammonium sulfate could be present in the solution as a catalyst. The amount or strength of the acid can be increased if faster solidification is required. Once the solution has penetrated into the formation to the desired depth, heat from the formation or a decrease in the pH of the solution below 12 causes the sodium salt of azodicarboxylic acid to decompose. Upon decomposition, said azodicarboxylic acid releases nitrogen and carbon dioxide gases sufficient for foaming the silicate solution containing the cationic surfactant. The surfactant stabilizes the foam generated which subsequently hardens. The foam will harden into a substantially impermeable solid. Following solidification of the foam, steam stimulation cycles can resume. The steam from subsequent steam injection cycles will be diverted to areas of the formation which have not been previously contacted by steam. Thus, additional areas of the reservoir will have lowered oil viscosities and reduced resistance to flow.

Where the formation is above the decomposition temperature of the sodium salt of azodicarboxylic acid, water or another cooling fluid can be used to cool the formation to allow the solution to penetrate to the desired depth. Should it not be desired to cool the formation, azodicarbonamide can be included in the silicate solution in the form of a microemulsion.

A thermodynamically stable dispersion can be made by placing azodicarbonamide in suitable oil and solubilizing said oil in the silicate solution with a suitable surfactant. A method for making a microemulsion is disclosed in U.S. Pat. No. 4,008,769 which issued to Chang on Feb. 22, 1977. This patent is incorporated by reference herein.

As is true for the other components in the solution, the components utilized are formation dependent and will vary. The concentration of silicate in the solution will also vary. The silicate solution may be injected in a series of slugs. It may be desired to increase the concentration with successive slugs to increase the strength of the foam nearest the wellbore, or to inject the desired volume of silicate solution with a subsequent injection of a quantity of solution with a higher concentration of silicate. The foam in the near wellbore area would have sufficient strength to withstand the high injection pressure of subsequent steam stimulation cycles.

In order to demonstrate the effectiveness of this invention, the following test was performed.

TEST

A 1% solution of azodicarbonamide (ABFA) was made in 1% $Na_2SiO_3$ which had an inital pH of 12.7. The blowing agent slowly dissolved with stirring to yield a clear, yellow solution of pH 11.4. Within a few hours, the solution had completely lost coloration, indicating complete decomposition. The final solution had a pH of 9.9. The kinetics of decomposition can be determined spectrophotometrically. The accompanying pH changes are complicated by $NH_3$ and $CO_3$ chemistry. Perhaps a week later a gel appeared which was colorless and loose. This test introduced the possibility of a combined alkaline-foam-gel treatment. The kinetics of blowing agent decomposition can be adjusted by the initial system pH to give variable propagation distances. Although a pH of 12.7 was able to convert the insoluble azodicarbonamide to the soluble carboxylate, it appears that a pH of 12.8 will readily react with the blowing agent. Calculation of kinetic data from the literature gave a carboxylate half life of 3.2 hours for 0.5% ABFA, 1% NaOH and 1% NaCl at 105° F.

The solution utilized herein to generate a foam for use in a steam flood during profile control can also be used for profile control during a waterflood. A waterflood method which can be used herein is disclosed in U.S. Pat. No. 4,458,760 issued to Hurd. This patent is incorporated herein by reference. After completing a water flooding operation, the more permeable zone of a multi-zone formation will have substantially all hydrocarbonaceous fluids removed. Hydrocarbonaceous fluids still remain in the area of lesser permeability. This novel foamed gel can be used to effectively close a zone of greater permeability. Once the zone of greater permeability is closed, a water flood can be used to remove hydrocarbonaceous fluids from the zone of lesser permeability.

In flooding operations, a liquid, usually water, is injected into the substerranean, oil-bearing formation through an injection well which extends from the surface of the earth down into the formation. A production well also extends into the formation at an offset or horizontal distance from the injection well so that, as the flooding liquid is injected into the information through the injection well, it displaces the oil towards the production well, from which it may be recovered. Often, more than one injection well and more than one production well will be used in order to cover the oil field adequately and maximize recovery. Various arrangements of injection and production wells are used to this end, e.g., linear arrangements to form a line drive, five spot, inverted five spot, seven spot, inverted seven spot, all of which are established in conventional practice.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A method for reducing the permeability in a subterranean formation having at least one zone of greater permeability and at least one zone of lesser permeability comprising:
   (a) injecting into the formation a solution comprising alkali metal silicate, a chemical surfactant, and a chemical blowing agent in an amount sufficient to produce foam in an amount sufficient to reduce permeability in a first zone of greater permeability where said blowing agent is a member selected from the group consisting of an alkali metal salt of azodicarboxylic acid, toluene sulfonyl hydrazide, or p,p'-oxybis benzenesulfonyl hydrazide; and
   (b) causing said chemical blowing agent to decompose thereby generating gas in an amount and rate sufficient to form a foam in combination with said silicate and surfactant which foam subsequently hardens and reduces permeability in said first zone.

2. The method as recited in claim 1 where the pH of said solution prior to injecting it into the formation is greater than about 12.

3. The method as recited in claim 1 where the temperature in said formation initiates the decomposition of an alkali metal salt of azodicarboxylic acid.

4. The method as recited in claim 1 where a weak acid is contained in said solution in an amount sufficient to lower the pH within the range of about 9.5 to about 11 once said solution has reached the desired depth in said formation thereby decomposing said chemical blowing agent, releasing gases sufficient for foaming, and initiating gelation.

5. The method as recited in claim 1 where successive slugs of said solution containing increased amounts of said alkali metal silicate are injected into the formation thereby forming a substantially stronger foam near a wellbore contained in said formation.

6. The method as recited in claim 1 where in step a) said solution is injected into said formation by at least one injection well.

7. The method as recited in claim 1 where said chemical blowing agent is an alkali metal salt of azodicarboxylic acid, which upon decomposition liberates nitrogen and carbon dioxide gases.

8. A method for reducing the permeability in a subterranean formation having at least one zone of greater permeability and at least one zone of lesser permeability comprising:
   (a) injecting into the formation a solution comprising alkali metal silicate, a chemical surfactant, and a chemical blowing agent in an amount sufficient to produce foam in an amount sufficient to reduce permeability in a first zone of greater permeability where said chemical blowing agent is a member selected from the group consisting of an alkali metal salt of azodicarboxylic acid, toluene sulfonyl hydrazide, or p,p'-oxybis benzenesulfonyl hydrazide;
   (b) causing said chemical blowing agent to decompose thereby generating gas in an amount and rate sufficient to form a foam in combination with said silicate and surfactant which foam subsequently hardens and reduces permeability in said first zone;
   (c) commencing a water flood or a steam flood oil recovery process into said formation thereby diverting recovery fluids from said first zone into a second zone of lesser permeability; and
   (d) recovering hydrocarbonaceous fluids from said second zone.

9. The method as recited in claim 8 where the pH of said solution prior to injecting it into the formation is greater than about 12.

10. The method as recited in claim 8 where the temperature in said formation initiates the decomposition of an alkali metal salt of azodicarboxylic acid.

11. The method as recited in claim 8 where a weak acid is contained in said solution in an amount sufficient to lower the pH within the range of about 9.5 to about 11 once said solution has reached the desired depth in said formation thereby decomposing said chemical blowing agent, releasing gases sufficient for foaming, and initiating gelation.

12. The method as recited in claim 8 where successive slugs of said solution containing increased amounts of said alkali metal silicate are injected into the formation thereby forming a substantially stronger foam near a wellbore contained in said formation.

13. The method as recited in claim 8 where in step a) said solution is injected into said formation by at least one injection well.

14. The method as recited in claim 8 where said chemical blowing agent is an alkali metal salt of azodicarboxylic acid, which upon decomposition liberates nitrogen and carbon dioxide gases.

15. A method for reducing the permeability in an area of a subterranean formation comprising:
   (a) injecting into the formation a solution comprising alkali metal silicate, a chemical surfactant, and an alkali metal salt of azodicarboxylic acid in an amount sufficient to reduce permeability in a desired formation area; and
   (b) causing the alkali metal salt of azodicarboxylic acid to decompose thereby generating nitrogen and carbon dioxide gas in an amount sufficient to form a foam which subsequently hardens and reduces the permeability in said desired area.

16. The method as recited in claim 15 where said azodicarboxylic acid salt decomposes by reducing the pH of the solution to less than about 12 or by injecting said solution into a formation having a temperature above about 125° F., which will further lower the pH within the range of about 9.5 to about 11 for optimum gelation.

17. The method as recited in claim 15 where said azodicarboxylic acid decomposes by reducing the pH to less than about 12 by incorporating a sufficient amount of a weak acid such as ammonium sulfate into said solution so that foaming will occur at a desired in the desired area, and subsequent pH decline will initiate gelation.

18. The method as recited in claim 15 where successive slugs of said solution containing increased amounts of said alkali metal silicate are injected into the formation thereby forming a substantially stronger foam near a wellbore contained in said formation.

19. The method as recited in claim 15, where in step a) said solution is injected into said formation by at least one injection well.

20. A method for reducing the permeability in a subterranean formation having at least one zone of greater permeability and at least one zone of lesser permeability comprising:
   (a) injecting into the formation a solution comprising alkali metal silicate and an alkali metal salt of azodicarboxylic acid in an amount sufficient to reduce permeability in a desired formation area; and
   (b) causing the alkali metal salt of azodicarboxylic acid to decompose thereby producing a surfactant in situ while generating nitrogen and carbon dioxide gas in an amount sufficient to form a foam which subsequently hardens and reduces the permeability in said desired area.

21. The method as recited in claim 20 where said azodicarboxylic acid salt decomposes by reducing the pH of the solution to less than about 12 or by injecting said solution into a formation having a temperature above about 125° F., which will further lower the pH within the range of about 9.5 to about 11 for optimum gelation.

22. The method as recited in claim 20 where said azodicarboxylic acid decomposes by reducing the pH to less than about 12 by incorporating a sufficient amount of a weak acid such as ammonium sulfate into said solution so that foaming will occur at a desired depth in the desired area, and subsequent pH decline will initiate gelation.

23. The method as recited in claim 20 where successive slugs of said solution containing increased amounts of said alkali metal silicate are injected into the formation thereby forming a substantially stronger foam near a wellbore contained in said formation.

24. The method as recited in claim 20 where in step a) said solution is injected into said formation by at least one injection well.

* * * * *

UNITED STATES PATENT AND TRADEMARK OFFICE
CERTIFICATE OF CORRECTION

PATENT NO. : 4,848,465
DATED : July 18, 1989
INVENTOR(S) : Randy D. Hazlett

It is certified that error appears in the above-identified patent and that said Letters Patent is hereby corrected as shown below:

Col. 1, line 11, "includind" should read -- including --

Col. 5, line 33, "substerranean" should read -- subterranean --

Col. 5, line 38, "information" should read -- formation --

Col. 7, line 37, after "desired" insert -- depth --

Signed and Sealed this

Seventh Day of May, 1991

*Attest:*

*Attesting Officer*

HARRY F. MANBECK, JR.

*Commissioner of Patents and Trademarks*